US012793117B2

(12) United States Patent
Lee et al.

(10) Patent No.: US 12,793,117 B2
(45) Date of Patent: *Nov. 10, 2026

(54) METHOD, SYSTEM, AND NON-TRANSITORY MACHINE-READABLE MEDIUM FOR ONE-PAGE CHECKOUT

(71) Applicant: PayPal, Inc., San Jose, CA (US)

(72) Inventors: Seung Hyo Lee, San Jose, CA (US); Desmond Kwokhon Chan, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 18/420,752

(22) Filed: Jan. 23, 2024

(65) Prior Publication Data

US 2024/0311896 A1 Sep. 19, 2024

Related U.S. Application Data

(63) Continuation of application No. 17/159,032, filed on Jan. 26, 2021, now Pat. No. 11,922,485, which is a continuation of application No. 15/872,926, filed on Jan. 16, 2018, now Pat. No. 10,902,500, which is a continuation of application No. 14/192,818, filed on Feb. 27, 2014, now Pat. No. 9,870,583.

(60) Provisional application No. 61/823,565, filed on May 15, 2013.

(51) Int. Cl.
*G06Q 30/0601* (2023.01)

(52) U.S. Cl.
CPC ..... *G06Q 30/0633* (2013.01); *G06Q 30/0641* (2013.01)

(58) Field of Classification Search
CPC ....................... G06Q 30/0633; G06Q 30/0641
See application file for complete search history.

(56) References Cited

U.S. PATENT DOCUMENTS

| | | | | |
|---|---|---|---|---|
| 6,862,612 | B1 | 3/2005 | Horn et al. | |
| 8,233,061 | B1 | 7/2012 | Su et al. | |
| 8,676,660 | B2 | 3/2014 | Yu et al. | |
| 9,830,587 | B1 * | 11/2017 | Bell | G06Q 20/322 |
| 2003/0040973 | A1 | 2/2003 | Marks | |

(Continued)

OTHER PUBLICATIONS

P. Garner, R. Edwards and P. Coulton, "Card-based Macropayment for Mobile Phones," 2006 International Conference on Mobile Business, Copenhagen, Denmark, 2006 (Year: 2006).*

"Channel Advisor Integrates Channel Advisor Merchant TM with Paypal Express Checkout," Business Wire, New York, Jul. 25, 2007, Accessed on Aug. 15, 2017, 3 pages.

(Continued)

*Primary Examiner* — Jeffrey A. Smith
*Assistant Examiner* — Latasha D Ramphal
(74) *Attorney, Agent, or Firm* — Haynes and Boone, LLP

(57) ABSTRACT

Systems and methods for facilitating a purchase are described. A user logs in to a payment service provider site. The user provides authorization to use a one-page checkout service. The user's information is captured during the session, and a cookie is placed on the user's device. When the user goes on a merchant website and checks out using the payment service provider, the payment service provider detects the cookie on the user device. The payment service provider uses the cookie, and in one embodiment, centrally stored information, to populate the one-page checkout page with the last used payment. In various embodiments, the one-page checkout page also displays a shipping address.

20 Claims, 5 Drawing Sheets

(56) References Cited

U.S. PATENT DOCUMENTS

| | | | | |
|---|---|---|---|---|
| 2009/0164315 | A1 | 6/2009 | Rothman | |
| 2009/0313147 | A1* | 12/2009 | Balasubramanian | G06Q 20/3223 709/204 |
| 2010/0145960 | A1 | 6/2010 | Casteel et al. | |
| 2010/0299220 | A1* | 11/2010 | Baskerville | H04L 67/565 705/26.35 |
| 2010/0332351 | A1 | 12/2010 | Stone | |
| 2012/0066090 | A1 | 3/2012 | Gangapurkar | |
| 2013/0046656 | A1* | 2/2013 | Koskelainen | G06Q 20/40 705/26.41 |
| 2013/0246943 | A1* | 9/2013 | Goodman | H04L 63/08 715/760 |
| 2014/0046780 | A1* | 2/2014 | Rothman | G06Q 30/0625 705/26.41 |
| 2014/0122328 | A1* | 5/2014 | Grigg | G06Q 20/384 705/40 |
| 2014/0324741 | A1 | 10/2014 | Stewart et al. | |

OTHER PUBLICATIONS

Li Z., "A Vulnerability Modeling Approach for Certifying Security in Components for E-Commerce," University of Alberta, Spring, 2008, 162 pages.

Sivakorn S., et al., "The Cracked Cookie Jar: HTTP Cookie Hijacking and the Exposure of Private Information," 2016 IEEE Symposium on Security and Privacy (SP), Retrieved from Internet URL: https://ieeexplore.ieee.org/document/7546532, 2016, 19 pages.

"System and Method for Simplified Checkout", filed Nov. 20, 2013, 16 Drawing Sheets, 43 pages.

* cited by examiner

METHOD, SYSTEM, AND NON-TRANSITORY MACHINE-READABLE MEDIUM FOR ONE-PAGE CHECKOUT

CROSS-REFERENCE TO RELATED APPLICATIONS

This application is a continuation of and claims priority to U.S. patent application Ser. No. 17/159,032, filed Jan. 26, 2021, which is a continuation of and claims priority to U.S. patent application Ser. No. 15/872,926 filed Jan. 16, 2018, issued as U.S. Pat. No. 10,902,500 on Jan. 26, 2021, which is a continuation of and claims priority to U.S. patent application Ser. No. 14/192,818, filed Feb. 27, 2014, issued as U.S. Pat. No. 9,870,583 on Jan. 16, 2018, which claims priority to U.S. Provisional Patent Application No. 61/823,565, filed May 15, 2013, all of which are incorporated herein by reference in their entirety.

BACKGROUND

Field of the Invention

The present invention generally relates to facilitating faster checkout, and more specifically to pre-populating a checkout page.

Related Art

Online or electronic commerce has become a large part of the global economy. Consumers are now able to purchase items through a merchant website. When a consumer makes a repeat purchase on a merchant website, the consumer frequently needs to provide payment information again, even though it was previously provided. The consumer typically goes through several review pages before giving a final approval of the payment. Further, each review page generally requires confirmation from the consumer of the information displayed on the page before letting the consumer move to the next review page. Such a typical payment process involves multiple review pages and is very time consuming and frustrating. The consumer typically does not wish to change any information related to payment and just wants to checkout as quickly as possible.

During the multi-page review process, many things may happen that interrupt a successful payment transaction. The Internet connection may be lost or un-stabilized in the middle, in which case the consumer may have to start the entire payment process over from the first page. Or, in the middle of multi-page review, the consumer may be interrupted by other matters or persons that may demand the consumer's immediate attention and stop the payment process before completion. Of course, the consumer may return and start the payment process over later on, but such return is not guaranteed. The consumer may lose interest in the attempted purchase or give up the purchase because a special sale or promotion period is over. Or, the consumer may just choose to give up the purchase out of frustration. In any case, the unsuccessful or incomplete payment session results in lost sales for the merchant and an unsatisfactory purchase experience for the consumer.

Therefore, a need exists for systems and methods that can eliminate multiple review pages during checkout.

Figure 1:
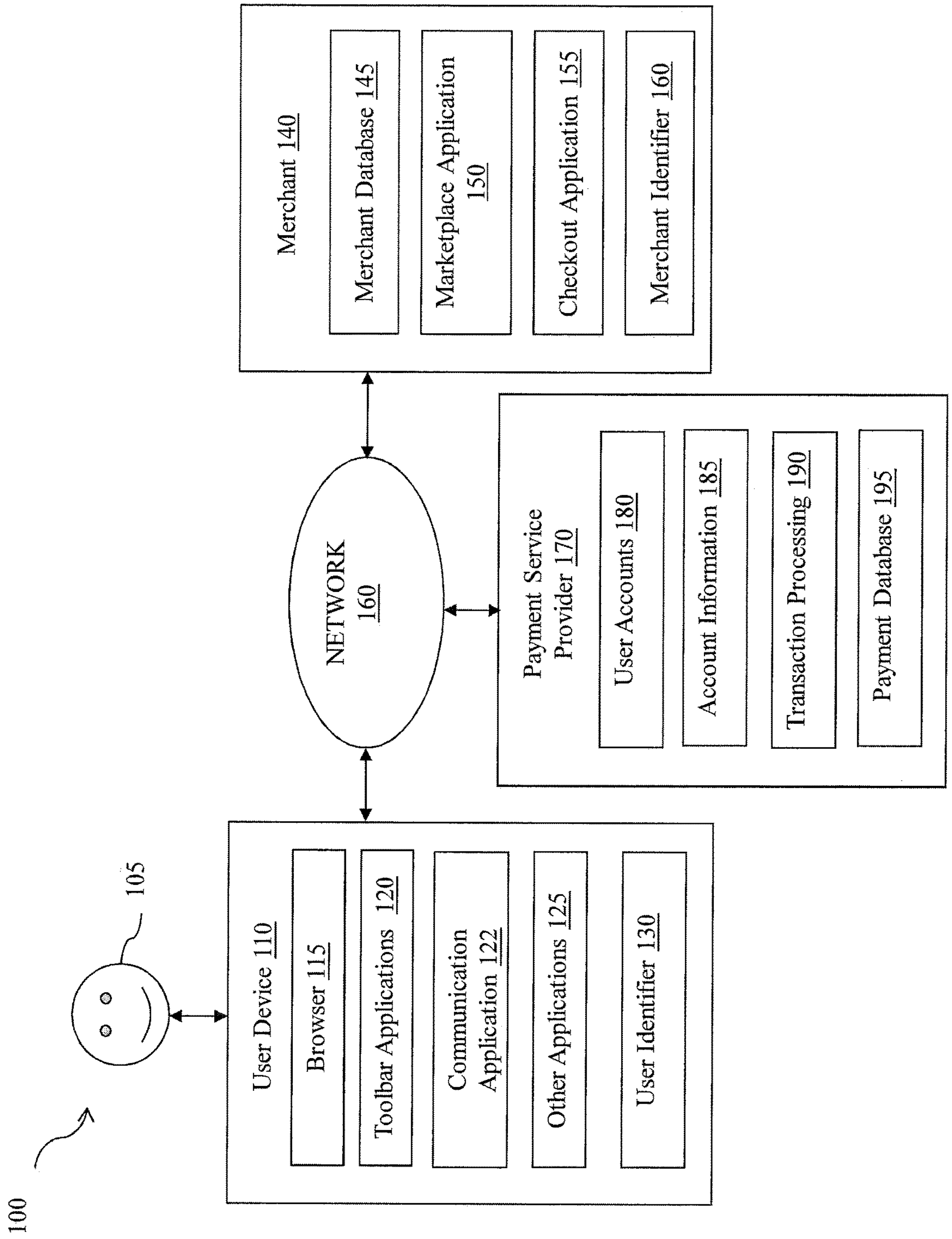
FIG. 1 is a block diagram illustrating a system for facilitating a purchase according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes techniques for facilitating faster checkout for a user. A user logs in to a payment service provider site. After a user has provided authorization, the user's information is captured and a cookie is placed on the user's device by the payment service provider. When the user goes on a merchant website and checks out using the payment service provider, the payment service provider detects the cookie on the user device. The payment service: provider uses the cookie to populate a one-page checkout page (or single checkout page) with the last used payment method and, in some embodiments a shipping address. In one embodiment, the shipping address is the last used shipping address stored by payment service provider. In other embodiments, the shipping address is supplied by the merchant.

In various embodiments, a user may use a service or payment service provider, such as PayPal®, Inc. of an Jose, CA, for making a payment for a purchase. After selecting the link to the payment provider, the user is directed to the payment service provider's website through a pop-up screen on the merchant site.

Typically, if the user has previously accessed the payment service provider's website for payment using the same user device, a cookie, issued by the payment service provider, is stored on the web browser of the user's device. In one embodiment, the cookie may contain user information such as user name and email address and/or information on the user's previous payment transaction performed via the payment service provider. In another embodiment, the cookie stores information on whether or not the user is eligible for faster checkout. For example, the payment service provider may decide that a user is eligible only if he or she is on a personal device or private computer, if no currency conversion is required, if the merchant does not require a gift or voting option, or if the merchant does not use merchant call-back capabilities.

When the user revisits the payment provider's website, the cookie stored on the user's web browser is automatically read by the payment service provider. The user may then be taken to a one-page checkout page offered by the payment service provider. In various embodiments, once the cookie is read, the last used payment method and in some embodiments a shipping address, populate the one-page checkout page, even before the user logs in to the payment service provider site. The shipping address may be the last used shipping address stored by the payment service provider, or may be supplied by the merchant associated with the merchant site. In some embodiments, a merchant may not want or need a shipping address (e.g., digital goods that don't require shipping), and no shipping address is displayed on the one-page checkout page.

FIG. 1 is a block diagram of a networked system 100 configured to handle processes, such as described herein, in accordance with an embodiment of the invention. System 100 includes a user device 110, a merchant server 140, and a payment service provider server 170 in communication over a network 160. Payment provider server 170 may be maintained by a service or payment provider, such as PayPal®, Inc. or eBay®, Inc. of San Jose, CA. A user 105, such as a consumer, utilizes user device 110 to make a purchase transaction facilitated by payment service provider server 170, with one or more merchants.

User device 110, merchant server 140, and payment service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160; For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet or access a website of the payment provider. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications. Applications 125 may also include email, texting, voice and IM applications that allow user 105 to send and receive emails, calls, texts, and other notifications through network 160. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication or identification. In one embodiment, user identifier 130 may be used by a payment service provider to associate user 105 with a particular account maintained by the payment provider. A communications application 122, with associated interfaces, enables user device 110 to communicate within system 100.

Merchant server 140 may be maintained, for example, by a merchant or seller offering various items, products and/or services through an online site or app. Generally, merchant server 140 may be maintained by anyone or any entity that receives money, which includes charities as well as retailers and restaurants. Merchant server 140 includes a database 145 identifying available products and/or services (e.g., collectively referred to as items) which may be made available for viewing and purchase by user 105. Database 145 may also include shipping addresses of the merchant's customers, e.g., user 105. Merchant server 140 also includes a marketplace application 150 which may be configured to serve information over network 160 to browser 115 of user device 110 and/or payment provider server 170. In one embodiment, user 105 may interact with marketplace application 150 to view various items available for purchase from the merchant.

Merchant server 140 also includes a checkout application 155 which may be configured to facilitate the purchase by user 105 of goods or services identified by marketplace application 150. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment service provider (e.g., a transaction ID). Checkout application 155 may also be configured to accept one or more different funding sources for payment.

The merchant server 140, in one embodiment, may include at least one merchant identifier 160, which may be included as part of the one or more items made available for purchase so that, e.g., particular items are associated with particular merchants. In one implementation, the merchant identifier 160 may include one or more attributes and/or parameters related to the merchant, such as business and banking information. In various embodiments, user 105 may conduct transactions (e.g., searching, selection, monitoring, purchasing, and/or providing payment for items) with each merchant server 140 via the payment service provider server 170 over the network 160.

A merchant website may also communicate (for example, using merchant server 140) with the payment service provider through payment service provider server 170 over network 160. For example, the merchant website may communicate with the payment service provider in the course of various services offered by the payment service provider to merchant website, such as payment intermediary between customers of the merchant website and the merchant website itself. For example, the merchant website may use an application programming interface (API) that allows it to offer sale of goods in which customers are allowed to make payment through the payment service provider, while user 105 may have an account with the payment service provider that allows user 105 to use the payment service provider for making payments to merchants that allow use of authentication, authorization, and payment services of payment service provider as a payment intermediary. The merchant website may also have an account with the payment service provider.

Payment service provider server 170 may be maintained, for example, by an online service provider which may provide payment between user 105 and the operator of merchant server 140. In this regard, payment provider server 170 includes one or more payment applications 175 which may be configured to interact with user device 110 and merchant server 140 over network 160 to facilitate the purchase of goods or services by user 105 of user device" 110 as well as search merchant offerings and prices as discussed above.

Payment service provider server 170 also maintains a plurality of user accounts 180, each of which may include account information 185 associated with individual users. For example, account information 185 may include private financial information of users of devices such as account numbers, passwords, device identifiers, user names, phone numbers, credit card information, bank information, or other financial information which may be used to facilitate online transactions by user 105. Account information 185 may also include information associated with the payment process described herein. Advantageously, payment application 175 may be configured to interact with merchant server 140 on behalf of user 105 during a transaction with checkout application 155 to handle payments.

A transaction processing application 190, which may be part of payment application 175 or separate, may be configured to receive information from a user device and/or merchant server 140 for processing and storage in a payment database 195 as described above. Transaction processing application 190 may include one or more applications to process information from user 105 and/or the merchant for processing a transaction from user device 110 as described herein. As such, transaction processing application 190 may store details of a transaction or from an email and associate the details accordingly with individual users. Payment application 175 may be further configured to determine the existence of and to manage accounts for user 105, as well as create new accounts if necessary, such as the set-up and management, and provide various services as described herein.

Figure 2:
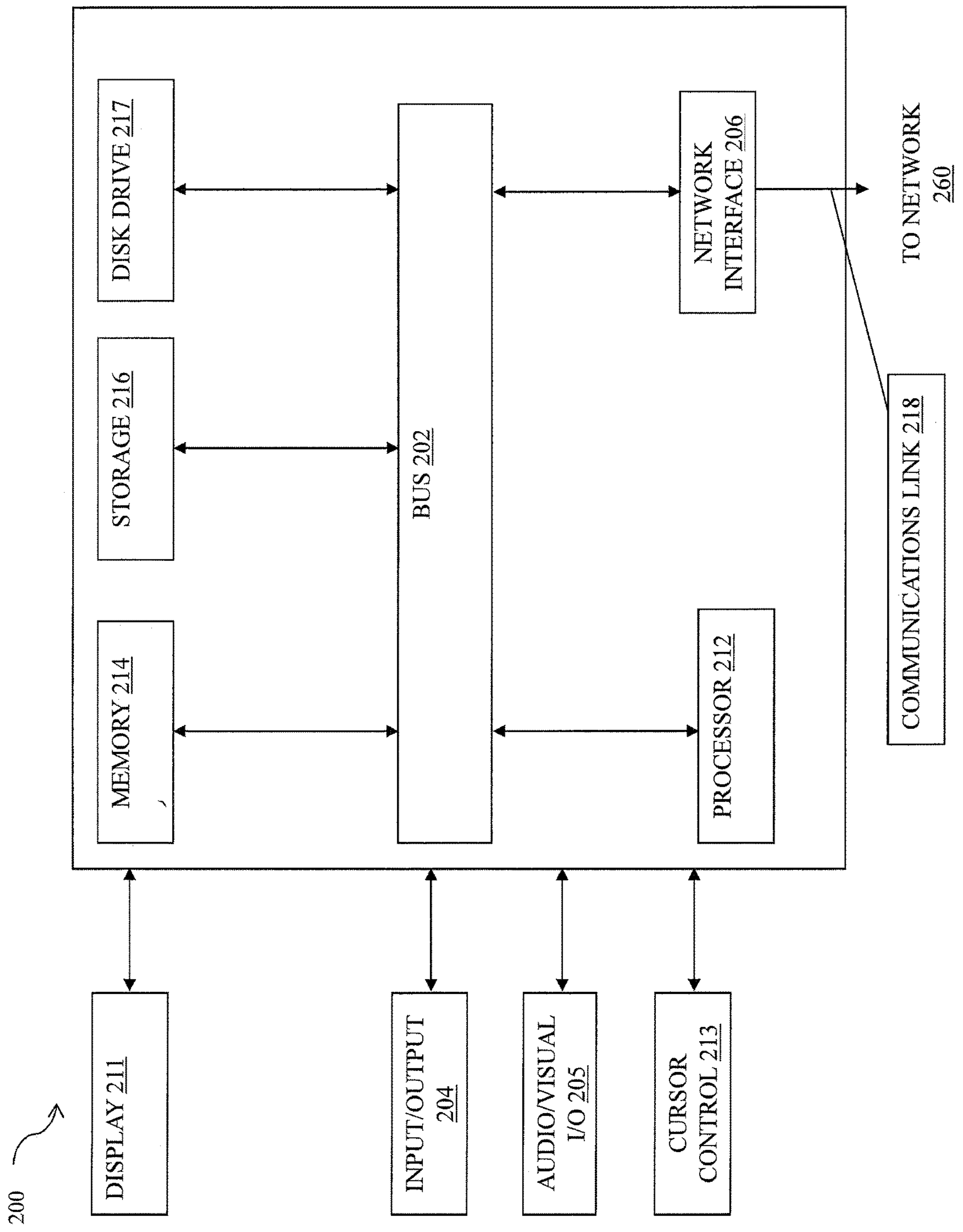
FIG. 2 is a block diagram of a system for implementing a device according to an embodiment of the present disclosure.

FIG. 2 is a block diagram of a computer system 200 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. The merchant and/or payment service provider may utilize a network computing device (e.g., a network server) capable of communicating with the network. It should be appreciated that each of the devices utilized by users, merchants, and payment service providers may be implemented as computer system 200 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). One or more optional audio/video (A/V) input/output (I/O) components 205 may also be included to allow a user to use voice and/or video for inputting information by converting audio signals. A/V I/O component 205 may allow the user to hear audio. A transceiver or network interface 206 transmits and receives signals between computer system 200 and other devices, such as another user device, a merchant server, or a payment service provider server via network 260. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217 to store information, such as account information, transaction numbers, machine IDs, and other information described above. Computer system 200 performs specific operations by processor 212 and other components by executing one or more sequences of instructions contained in system memory component 214. Instructions may be performed by one or more processors 212. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 3:
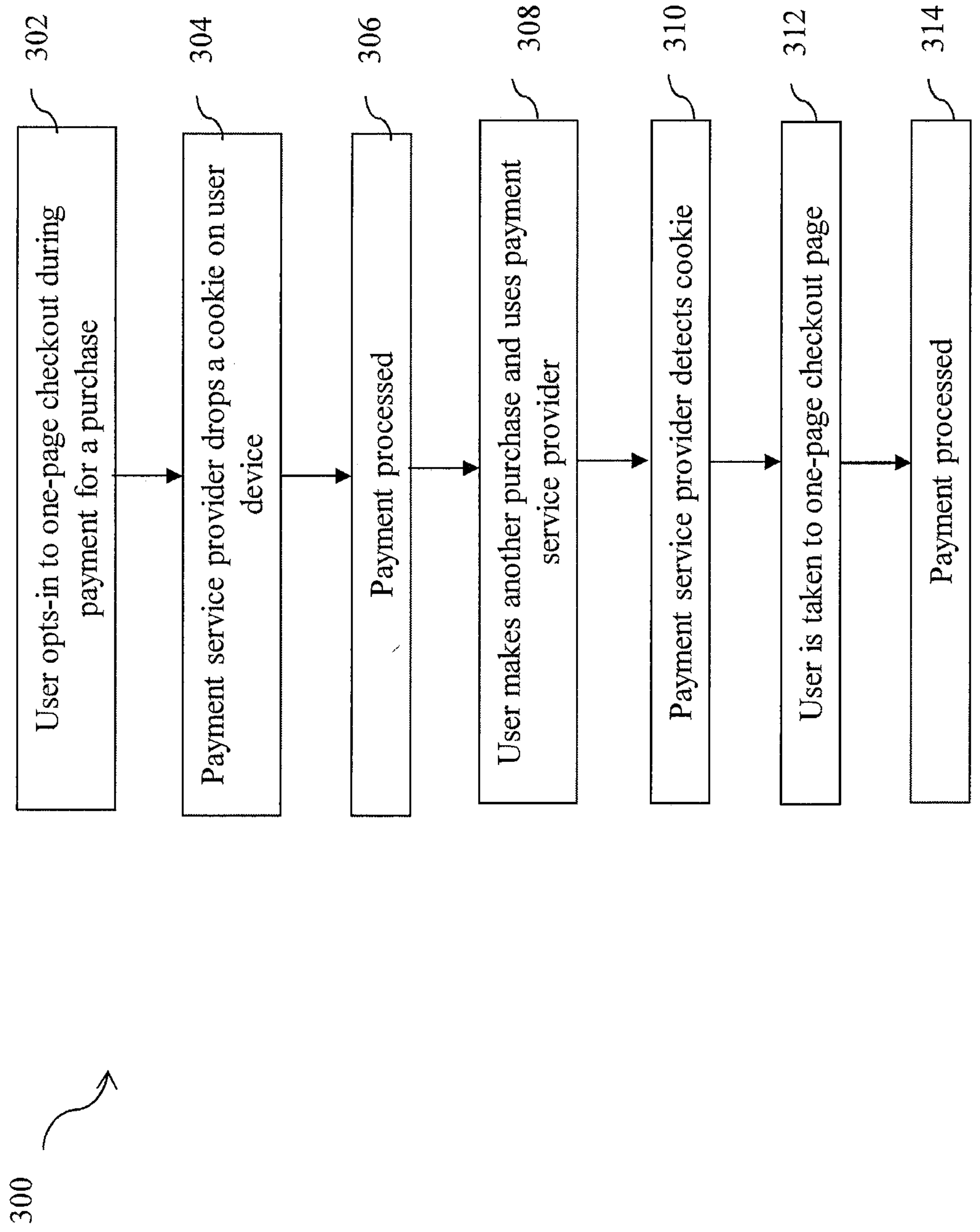
FIG. 3. is a flowchart showing a method for facilitating a purchase according to an embodiment of the present disclosure.

Referring now to FIG. 3, a flowchart 300 for facilitating a purchase is illustrated according to an embodiment. The user 105 goes through a conventional checkout process. For example, the user 105 may access a merchant site, seller site, marketplace site, or other site or mobile app that enables a user to shop and make a purchase. Access may be through a PC, computing tablet, smart phone, or other computing device. The purchase may be items, physical goods, digital goods, donations, services, etc.

The user 105 then selects desired items for purchase. Note that items, as used herein, may include one or more of the different purchases listed above. The selected items may be placed in a cart, which the user 105 can review and edit if needed. The user 105 continues by entering information for the purchase, such as shipping address, billing address for a credit card, and funding source information. Such information may be pre-populated if it was saved within the site. In that case, the user 105 would simply need to confirm the information or revise if needed. If the information is not saved, the user 105 may need to manually enter the requested information.

Once the requested information has been entered or provided, the user 105 may confirm the order. Before confirmation, the user 105 may be presented with details of the purchase, such as item description, item prices, total price, shipping costs, tax, etc. If the details are acceptable and correct, the user 105 may select a "Confirm," "Pay," or other button or link to confirm the order.

If the user 105 is paying with a payment service provider, such as PayPal® Inc. of San Jose, the user 105 selects an appropriate button or link on the merchant page. The user 105 is then presented with a login screen, either as a new page or a pop-up screen on the same page, requesting login information, such as a user identifier (e.g., user name, email address) and a password or PIN.

Figure 4:
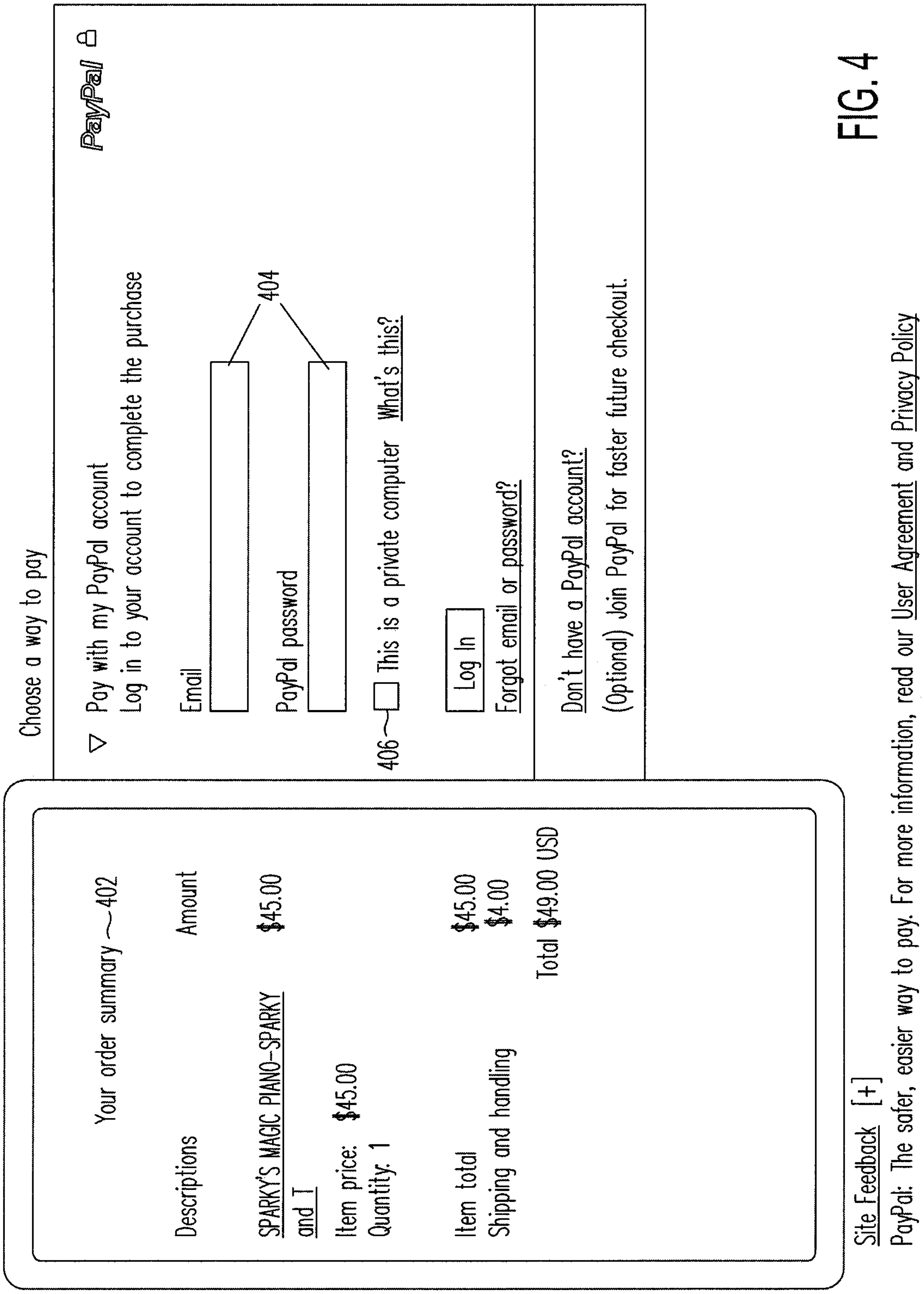
FIG. 4 is a screenshot of an interface that is displayed to a user during an opt-in step.

FIG. 4 is an example page that is shown to the user 105. To the left is the order summary 402, while the right includes areas 404 for entering email and password information. In various embodiments, at step 302, the user 105 opts-in to the one-page checkout experience. For example, the user 105 checks a box 406, confirming that the user device he or she is using is a private computer and indicating that he or she wants a more streamlined checkout experience.

Once this authorization is obtained, at step 304, the payment service provider captures user information during the session and drops a cookie on the user device 110. The cookie indicates to the payment service provider that the user 105 is eligible and authorized for one-page checkout. In some embodiments, user information is stored as cookies and may include the user 105's identification, password, address, and payment information. Payment is processed at step 306 and is subsequently logged out of the payment service provider site.

At step 308, the user 105 makes another purchase on a merchant site and once again, uses the payment service provider to pay for the purchase. The payment service provider detects the cookie on the user device 120 at step 310 and makes sure that the user 105 is eligible for and c1.uthorized to use the one-page checkout service. In some cases, the cookie may not be sized big enough to store all information necessary for processing a payment, such as the last used funding source information or the last used shipping address, which can be long. In this situation, the payment service provider may retrieve a minimum amount of data indicating the user 105's eligibility to use the one-page checkout page feature from user 1OS's browser and retrieve the last used funding source information and/or the last used shipping address from a database.

When the cookie does store the last used funding source and the last used shipping address, it may store them in partially masked format. When saving the last used funding source, the cookie generally stores the total number of available funding sources. Further, if there is a back-up funding source, such as a credit card, in addition to the last used funding source, such as a bank, the cookie stores both bank information and the credit card information.

Figure 5:
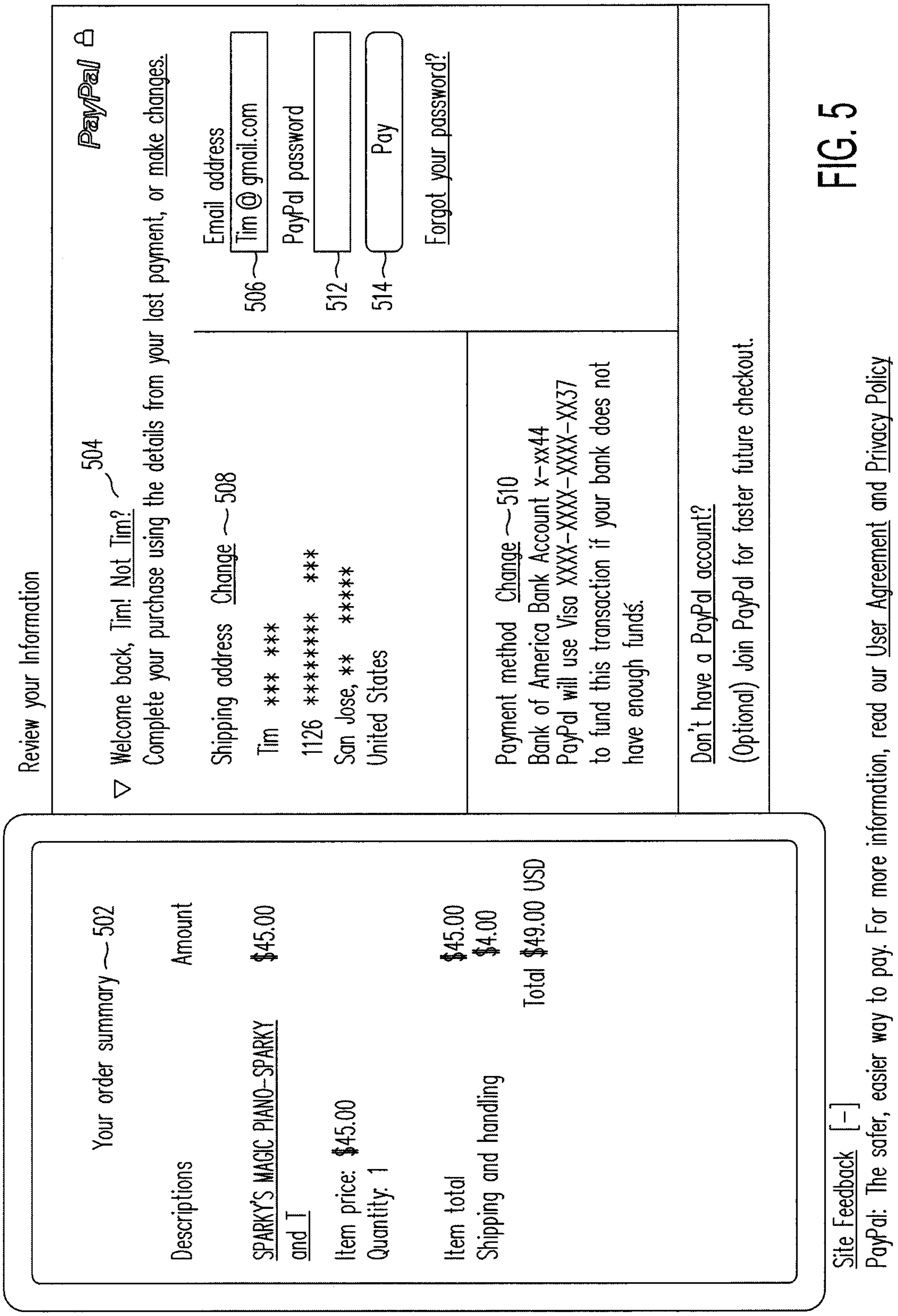
FIG. 5 is a screenshot of an interface that is displayed to a user during one-page checkout.

At step 312, the user 105 is taken to the one-page checkout page. The one-page checkout page may be displayed as new page or a pop-up screen on the same page. FIG. 5 is an example of the one-page checkout page. The one-page checkout page may display, in an embodiment of the present disclosure, the stored name 504 and the email address 506 of the user 105, the shipping address 508, the last used payment method 510, the password field 512 and the pay button 514. The name of the user 105, stored in the cookie or identified via a user identifier stored in the cookie, may be shown on the one-page checkout page, along with a welcoming message, such as "Welcome back, [the user's name]." The email address of the user, which may be also stored in the cookie or retrieved from a database using the cookie, may be displayed in an un-editable form. At this point, the user 105 need only provide his or her password and press "Pay" to complete the transaction.

If the user 105 who is on the one-page checkout page is not the one whose name is shown, a link, such as "Not you?" may be provided next to the displayed name so that the user 105 can make a change. When the user 105 clicks on the link, the link takes the user 105 to the login page of the payment service provider where he or she can log in by providing a login ID such as an email address and a password or PIN.

The shipping address 508, taken from the cookie, retrieved from a payment service provider database using the cookie, or supplied by the merchant associated with the merchant site, is displayed on the one-page checkout page in FIG. 5. In one embodiment, the merchant requires a shipping address, but no shipping address is provided by the user 105. In this case, the shipping address may be provided by the payment service provider or supplied by the merchant. When the shipping address is provided by the payment service provider, a portion of the shipping address information may be masked as stored in the cookie, leaving only a portion sufficient for the user 105 to recognize it. For example, the street name of the shipping address may be denoted as "xxxxx." When the shipping address is supplied by the merchant, the full address is shown. Also, if the user 105 wishes to view or change the shipping address, a link that reads, for example, "view/change," may be provided next to the last used shipping address. Again, if clicked or otherwise selected, the link will take the user 105 to the login page of the payment service provider.

In some embodiments, the shipping address is not displayed on the one-page checkout page. This may happen when the user 105 has newly provided and confirmed a shipping address for the current purchase at the merchant's site before being directed to the payment service provider's website, when the merchant may have requested to redirect the user 105 to the merchant site after processing the payment at the one-page checkout to determine the shipping address then, or when the merchant has requested the payment service provider not to show the shipping address for various business reasons.

The last payment method 510 used by the user 105 is displayed on the one-page checkout page in FIG. 5. For example, the last payment method may be a credit card, debit card, bank account, or account with the payment service provider. In some embodiments, when the last used funding source is shown as the primary funding source, and if there is a back-up funding source saved in the cookie, both the primary and back-up funding sources are displayed. For example, if the last used funding source is a bank and the back-up funding source is a credit card, both the primary bank and the back-up credit card information are shown.

When showing the credit card information, the one-page checkout page may also show the merchant descriptor as will be shown in the account statement of the funding source, such as "This transaction will appear on your bill as a payment to [the merchant's name the payment is made to]." Such a merchant descriptor may be obtained either from the cookie or from other independent data sources saved with the payment service provider. Further, when showing the last used funding source information, part of the information may be masked as stored in the cookie in an embodiment. For example, when the funding source is a credit card, the entire account number except for the last two or three digits may be masked. If the user 105 wishes to view or change the funding source(s), a link that reads as, for example, "view/change," may be provided next to the last used funding source information displayed. If clicked or otherwise selected, the link will take the user to the login page of the payment service provider.

In one embodiment, the last used payment method and the last used shipping address are the method and address most recently used with the payment service provider. For example, if the last time the user 105 used the payment service provider, he or she used a credit card and home address, then the credit card and home address are displayed.

In another embodiment, the last used payment method and the last used shipping address are the method and address most recently used for a particular merchant. For example, if the last time the user 105 shopped at Bath & Body Works, he or she used a bank account number and a business address, then the next time the user 105 shops at Bath & Body Works, the bank account number and business address are displayed.

The one-page checkout page may also display a password field 512 for the user 105 to enter the password he or she has with the payment service provider, and a pay button 514 that reads, for example, "Pay." Requiring the password is an added measure of user authentication to prevent fraud such as when a wrongdoer acquires the user's device and accesses the one-page checkout page using the true user's cookie in the user's device. Entering the password and clicking on the pay button authenticate the user 105, confirm that all the information displayed on the one-page checkout page is correct, and show approval by the user 105 to proceed with the payment.

After entering a password into the password field and selecting the pay button, the login process is automatically processed with the provided password. If the login fails, for example, from a mistyped password, an error message may pop up and the user 105 may be given a chance to retype the password on the one-page checkout page or a separate pop-up window. If the login fails for a second time, the user 105 may be directed to the login page of the payment service provider for logging in and processing payment via a more conventional checkout process. In this case, the cookie value in the user's web browser may be cleared off or overwritten by new features.

In some situations, clicking on the pay button may not result in the instantaneous processing of the payment. Some merchants may require the user 105 to be redirected back to the merchant site after checking out at the payment service provider site, and the payment to be actually processed by the payment service provider only when the merchant subsequently transmits a call, such as a Do Express Checkout Call, to the payment service provider. In this case, instead of the "Pay" button or a link for a user's confirmation and approval, the one-page checkout page may read as "Continue." Clicking on this button takes the user 105 to the merchant site.

If the automatic and direct login from the one-page checkout page is successful, the payment service provider may call an internal service to check if the last used funding source shown on the one-page checkout page and confirmed by the user 105 conforms with the default funding source assigned by the payment service provider or determined by the user 105 during the account set up. If they are the same, then the payment service provider processes payment with the last used funding source. If it is accepted without any error, the payment service provider directs the user 105 to the next destination, which may be either a confirmation page ("done" page) or the merchant's site on which the user 105 made the current purchase. The one-page checkout page is removed from the display. At step 314, the payment is processed.

If, however, the default funding source is different from the last used funding source shown on the one-page checkout page, or if the last used funding source is known to be inadequate by, for example, account expiration, insufficient balance, or temporary malfunctioning for technical reasons, then the user 105 may be taken to a review page of the payment service provider where the user 105 is shown a message explaining the situation and asked to reconsider, confirm, change, add, or choose the funding source for the current purchase. In this situation, in some embodiments, the payment service provider may automatically choose and suggest a funding source for the user 105 to confirm. Any other kind of error that may happen after the user 105 selects the pay button on the one-page checkout page may take the user 105 to the same kind of the review page of the payment service provider, where the user 105 may be given a chance to sort out things to correct the error.

In the above description, the last used information is provided on the one-page checkout page. However, different information may displayed. For example, the most widely used funding source or the most widely used shipping address may be displayed instead of the last used funding source or shipping address.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed:

1. A system comprising:

a non-transitory memory; and one or more hardware processors in communication with the non-transitory memory and configured to execute instructions from the non-transitory memory to cause the system to:

receive, via an interface associated with a merchant application presented on a device, a request to perform a streamlined checkout in association with a transaction between a user of the device and a merchant associated with the merchant application;

access a data file stored on the device, wherein the data file was generated by a payment service provider application associated with a payment service provider and different from the merchant application during a previous session between the payment service provider application and the device;

determine that the device is eligible for the streamlined checkout based on the data file indicating that the device is a private device;

extract, from the data file, information related to a first funding source and a second funding source associated with an account with the payment service provider, the information being at least partially masked;

without requiring the user to login to the account with the payment service provider, present a user interface associated with the payment service provider on the device, wherein the user interface is separate from the merchant application and includes the information related to the first funding source and the second funding source;

receive, via the user interface, a selection of a particular funding source from the first funding source and the second funding source;

retrieve, from a database external to the device, payment data associated with the particular funding source based on the information and the selection, wherein the payment data comprises unmasked data associated with the particular funding source;

process the transaction based in part on the payment data associated with the particular funding source; and redirect the device from the user interface back to the interface of the merchant application.

2. The system of claim 1, wherein the information is further related to a third funding source associated with the account, and wherein executing the instructions further causes the system to:

determine that the third funding source is unavailable for the transaction; and exclude the third funding source from the user interface.

3. The system of claim 1, wherein the merchant application is associated with a merchant website.

4. The system of claim 1, wherein executing the instructions further causes the system to:

prior to receiving the request to perform the streamlined checkout, receive, via a second user interface associated with the payment service provider, an indication for participating in a streamlined checkout process for a subsequent transaction;

generate the data file using historic transaction data associated with the account; and store the data file on the device.

5. The system of claim 4, wherein executing the instructions further causes the system to log the user out of the account with the payment service provider after storing the data file.

6. The system of claim 1, wherein the information includes one or more shipping preferences of the user.

7. The system of claim 6, wherein executing the instructions further causes the system to:

subsequent to processing the transaction, transmit the one or more shipping preferences of the user to a merchant server associated with the merchant.

8. A method, comprising:

receiving, by a computer system associated with a payment service provider, a request to process a transaction between a user and an entity, wherein the request is received via an interface associated with a first application of the entity and presented on a device of the user;

accessing, from a data file stored on the device, information related to a first funding source and a second funding source associated with an account with the payment service provider, wherein the data file was stored on the device by a second application of the device and different from the first application during a previous session between the payment service provider and the device, and wherein the information is at least partially masked;

determining that the device is eligible for a streamlined checkout based on the data file indicating that the device is a private device;

without requiring the user to login to the account with the payment service provider, providing a user interface associated with the payment service provider on the device, wherein the user interface is separate from the first application and includes the information related to the first funding source and the second funding source;

in response to receiving a selection of a particular funding source via the user interface, retrieving, from a database external to the device, payment data associated with the particular funding source based on the information and the selection, wherein the payment data comprises unmasked data associated with the particular funding source, and wherein the particular funding source is one of the first funding source or the second funding source; and processing the transaction based in part on the payment data associated with the particular funding source.

9. The method of claim 8, further comprising:

redirecting the user of the device from the user interface back to the interface of the first application.

10. The method of claim 9, wherein the processing the transaction is performed after the user of the device is redirected back to the interface of the first application.

11. The method of claim 8, wherein the information is further related to a third funding source associated with the account, and wherein the method further comprises:

determining that the third funding source is unavailable for the transaction; and excluding the third funding source from the user interface.

12. The method of claim 11, wherein the determining that the third funding source is unavailable for the transaction is based on at least one of a balance of the third funding source or an expiration date of the third funding source.

13. The method of claim 8, wherein the user interface is presented in a pop-up window.

14. The method of claim 8, further comprising:

prior to the receiving the request, generating the data file using historic transaction data associated with the account; and storing the data file on the device.

15. A non-transitory machine-readable medium having stored thereon machine-readable instructions executable to cause a machine associated with a payment service provider to perform operations comprising:

receiving, via an interface associated with a first online application presented on a device, a request to process a transaction between a user of the device and an entity associated with the first online application;

accessing a data file associated with the payment service provider and stored on the device, wherein the data file was generated by a second online application different from the first online application during a previous session with the device;

determining that the device is eligible for a streamlined checkout based on the data file indicating that the device is a private device;

extracting, from the data file, information related to a first funding source and a second funding source associated with an account with the payment service provider, and wherein the information is at least partially masked;

independent of the user logging in to the account with the payment service provider, providing a user interface associated with the payment service provider on the device, wherein the user interface is separate from the first online application and includes the information related to the first funding source and the second funding source;

receiving a selection of a particular funding source via the user interface, wherein the particular funding source is one of the first funding source or the second funding source;

retrieving, from a database external to the device, payment data associated with the particular funding source based on the information and the selection, wherein the payment data comprises unmasked data associated with the particular funding source; and processing the transaction based in part on the payment data associated with the particular funding source.

16. The non-transitory machine-readable medium of claim 15, wherein the operations further comprise:

redirecting the user of the device from the user interface back to the interface of the first online application.

17. The non-transitory machine-readable medium of claim 15, wherein the operations further comprise:

prior to the receiving the request, generating the data file using transaction data associated with the account; and storing the data file on the device.

18. The non-transitory machine-readable medium of claim 17, wherein the operations further comprise logging the user out of the account with the payment service provider prior to the receiving the request.

19. The non-transitory machine-readable medium of claim 15, wherein the operations further comprise:

obtaining one or more shipping preferences of the user based on the information; and transmitting the one or more shipping preferences of the user to a server associated with the entity.

20. The non-transitory machine-readable medium of claim 15, wherein the information is further related to a third funding source associated with the account, and wherein the operations further comprise:

determining that the third funding source is unavailable for the transaction; and excluding the third funding source from the user interface.

* * * * *